Aug. 18, 1936.   C. SHEARD ET AL   2,051,317
PHOTELOMETER
Filed March 11, 1933   2 Sheets-Sheet 1

Inventors
Charles Sheard
Arthur H. Sanford
Dana A. Rogers
By Gillson, Mann & Co. Attys.

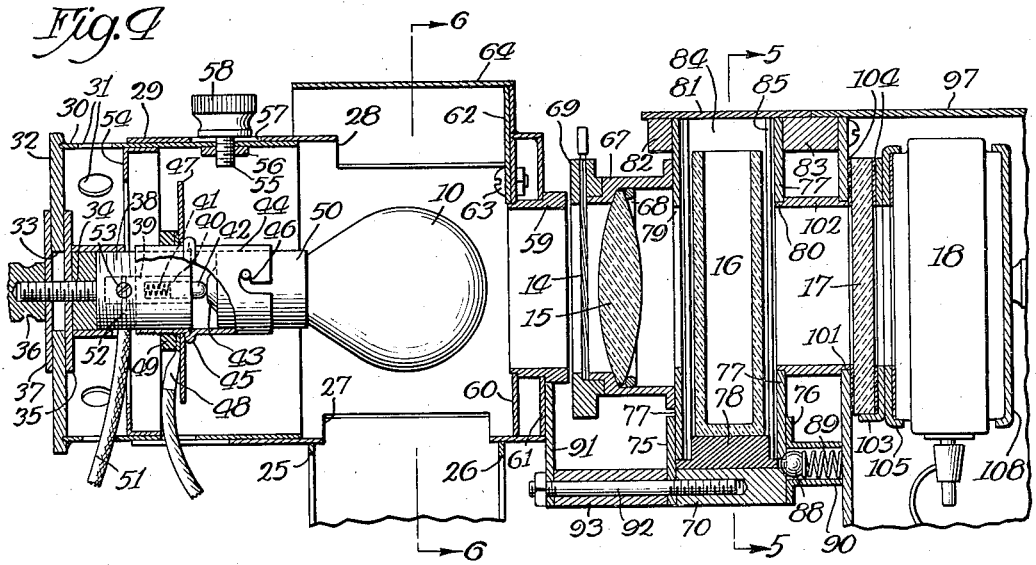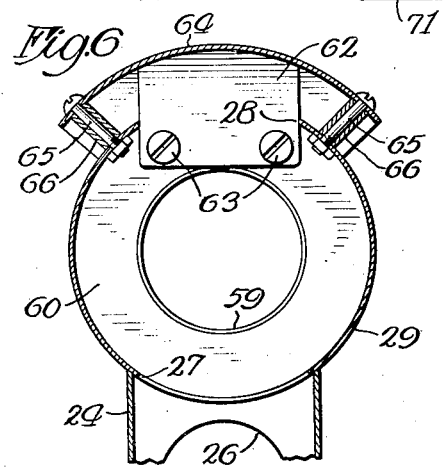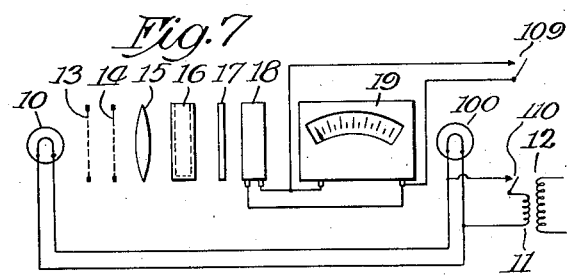

Patented Aug. 18, 1936

2,051,317

UNITED STATES PATENT OFFICE 2,051,317

PHOTELOMETER

Charles Sheard, Arthur H. Sanford, and Dana A. Rogers, Rochester, Minn.

Application March 11, 1933, Serial No. 660,400

6 Claims. (Cl. 88—14)

When a light source of constant intensity is permitted to fall upon a translucent substance, it will be found that different wave lengths are transmitted unequally, and that for each translucent substance, one can obtain a characteristic curve by plotting the relative values of light transmission for the different wave lengths. Since no two substances have exactly the same spectral transmission curve, it is possible to identify substances to a certain extent by their characteristic curves. The phenomenon is also useful in problems involving quantitative analysis, color analysis, and in the ascertainment of many other elusive facts.

For the purpose of this disclosure, the invention will be described as applied to a hemoglobinometer, but it will be distinctly understood that the scope of this invention is not limited to this particular embodiment and illustrative use of the invention.

Primarily, the object of this invention is to provide an apparatus and method for obtaining accurate data concerning substances by making use of their characteristic spectral transmission curves.

Other objects of the invention are: To provide a light and compact apparatus that can be carried easily from place to place; to make it unnecessary to use but a single source of electrical energy for the operation of the entire apparatus; to facilitate the taking of readings and cut down the time necessary for making observations; and to produce an apparatus which will be extremely accurate and reliable in operation.

Further and other objects and advantages will become apparent as the disclosure proceeds and the description is read in conjunction with the accompanying drawings, in which Fig. 1 is a plan view of a preferred embodiment of the invention with parts broken away;

Fig. 4 is a fragmentary, longitudinal, sectional view taken on the line 4—4 of Fig. 1;

Fig. 5 is a sectional view of the cell carrier, the section being taken on the line 5—5 of Fig. 4;

Fig. 6 is a transverse, sectional view through the lamp housing, the section being taken on the line 6—6 of Fig. 4;

Fig. 7 is a diagrammatic view showing the electrical circuit and the relative position of the component elements of the apparatus.

Since a hemoglobinometer has been chosen as an illustrative embodiment of the invention, it is well to have a clear understanding of the theory upon which it operates.

Let a sample of blood be taken and diluted to 1:200 with 0.1% sodium carbonate solution and then thoroughly shaken with air to form oxy-hemoglobin. Then let this solution be placed in a transparent cell so that the thickness of the solution is exactly one cm. If light of constant intensity is then passed through the cell, it will be found, by measuring the unabsorbed light, that the spectral transmission curve of the substance in solution takes the form shown by curve A in Fig. 3.

The concentration of the solution may be determined according to the formula $$C = -\frac{A}{D} \log_{10} F,$$

in which C is the concentration of the substance in solution, A is the absorption ratio, D is the thickness of the solution, and F is the fraction of light transmitted. The same relationship may be expressed by saying that the concentration of hemoglobin or other substance in solution is proportional to the negative logarithm of the fraction of light transmitted.

The constants A and D may be obtained by suitable calculation which is unnecessary to outline in detail here. When these constants have been determined, it is possible to draw a curve in which the concentration of the substance in solution is plotted against the percentage light transmission and from this curve readings obtained on the photelometer for percentage light transmission may be converted immediately into terms of concentration.

Figure 1:
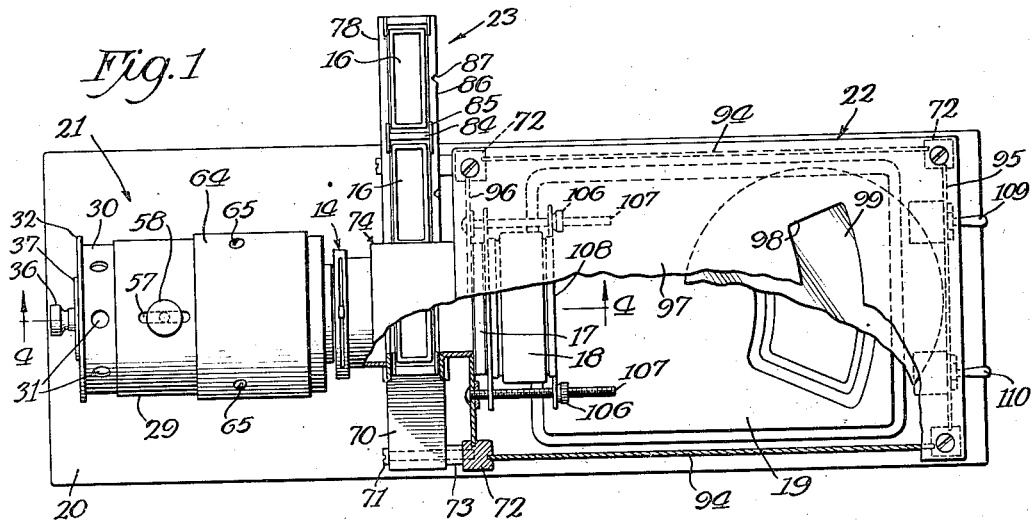
Figure 2:
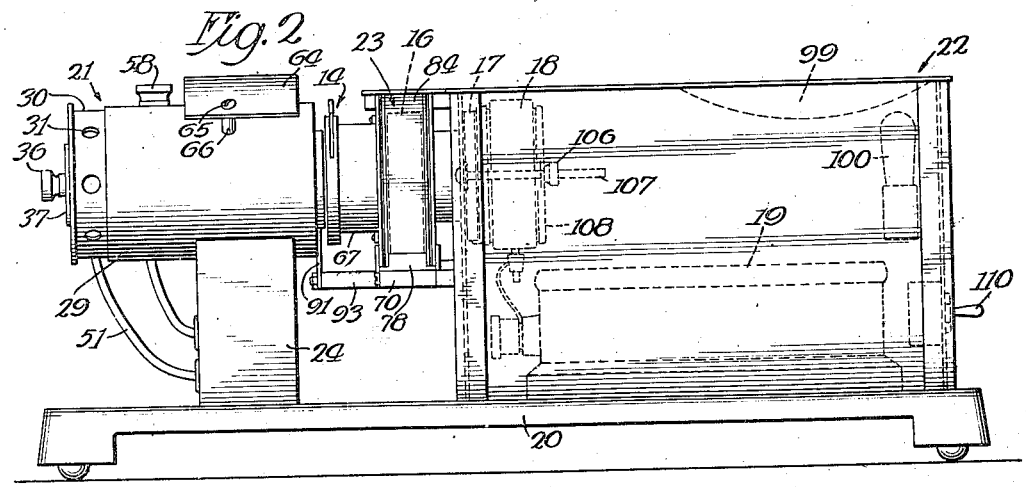
Fig. 2 is a side elevational view of the apparatus shown in Fig. 1.
Figure 3:
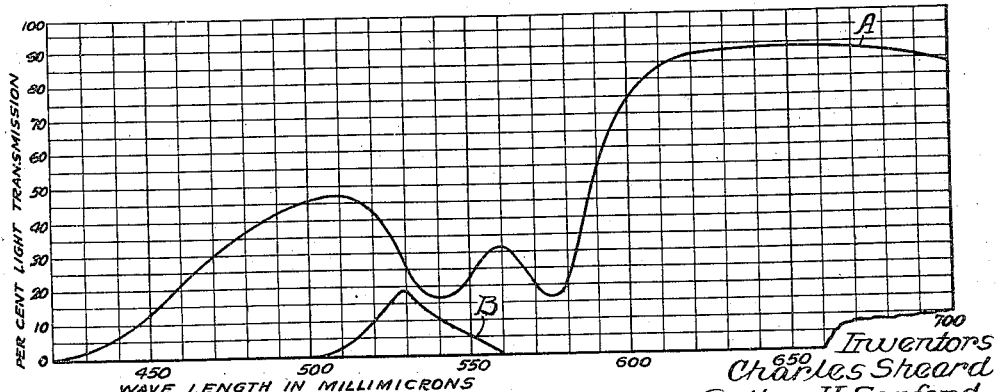
Fig. 3 is a graph showing the light transmission curve of oxy-hemoglobin (curve A) and of Eastman filter No. 74 (curve B).

It will be observed from the curve A in Fig. 3 that oxy-hemoglobin has two characteristic absorption bands, one occurring at 542 millimicrons and the other at 578 millimicrons. The former band is usually termed the beta band and the latter the alpha band.

Since oxy-hemoglobin has a characteristic ability to absorb light in the vicinity of 542 millimicrons, it is apparent that the concentration of an oxy-hemoglobin solution could be obtained if its ability to absorb light in this band could be compared with some standard, such as pure water. But to make this comparison, it is necessary to filter out all light outside of the characteristic band.

Experiments have shown that the Eastman-Wratten light filter No. 74 manufactured by the Eastman Kodak Company of Rochester, New York has a light transmission band which is substantially complementary to the beta absorption band of oxy-hemoglobin. This relationship of filter No. 74 to the beta absorption band of oxy-hemoglobin is shown in Fig. 3. Although maximal transmission in filter No. 74 (see curve B) occurs at about 530 millimicrons, whereas the maximal absorption of the beta band of oxy-hemoglobin occurs at 542 millimicrons, the two have been found sufficiently close to one another to obtain accurate results.

Referring now to Fig. 7, an application of the above principles is diagrammatically illustrated. The reference character 10 designates a constant source of illumination, preferably a 6 volt, 50 candle power incandescent lamp, which is fed from the secondary coil 11 of a constant voltage transformer 12, the primary of which is connected to a suitable source of current, such as the usual 110 volt alternating current line. A transformer which has been found to be satisfactory for delivering constant voltage to the lamp 10 is made by the Sola Electric Company, 2525 Clybourn Avenue, Chicago, Illinois.

The light waves emitted from the lamp 10 are passed successively through a shutter 13 (shown only in Fig. 7) an iris diaphragm 14, a condensing lens 15, a cell 16, adapted to contain the specimen under observation, and a light filter 17, preferably Eastman filter No. 74. The unabsorbed light is then allowed to fall upon a light sensitive cell 18, connected in series with a galvanometer 19.

The cell 18 consists essentially of a metal disk on which a thin film of light sensitive material is deposited. When light falls upon the cell, the metal disk becomes positive, and the film negative, so that when the two are connected by an external circuit, current will flow from one to the other. The strength of the current within certain limits is proportional to the density of the luminous flux, and is capable of measurement by the galvanometer 19, without the use of supplemental batteries, or other additional electromotive force.

A cell of this kind which has been found to be satisfactory is manufactured by the Weston Electrical Instrument Corporation of Newark, N. J., and is known as the Weston photronic cell. The galvanometer 19 is also preferably of their manufacture and is their model No. 440.

The entire apparatus is mounted on an elongated base 20, preferably made of aluminum. At one end of the base, for convenience termed the rear end, there is provided a lamp housing 21 in which the lamp 10 is adjustably mounted; and at the other or forward end of the base, a box-like enclosure 22 houses the filter 17, the light sensitive cell 18 and the galvanometer 19. Between the lamp housing and the galvanometer enclosure, there is provided a cell carrier 23 which is adapted to removably support the cells containing the specimens under test.

The lamp housing 21 is supported on the base 20 by a tubular pillar 24 provided with front and rear openings 25 and 26, respectively, which permit a circulation of air through the openings 27 and 28 in the lamp housing body 29. The lamp 10 which is adjustably positioned in the path of the current of air is thereby maintained relatively cool, and heating of the specimen under observation by the lamp is minimized.

The lamp 10 is carried by a sleeve 30 which telescopes within the housing body 29 and is provided with a plurality of circumferential openings 31. The rear end of the sleeve 30 is closed by a disk 32 preferably of brass which has an enlarged opening 33 receiving the stud 34 which supports the lamp.

The stud 34 is threaded into the reinforced base of a socket member 35, and extends rearwardly through the opening 33 where it receives a nut 36 which seats upon a washer 37. The socket member 35 can be adjusted laterally and vertically within the limits of the size of the opening 33 by unloosening the nut 36 and moving the socket to its desired position. The nut 36 is then tightened to hold the lamp in adjusted position.

A plug 38 of insulating material is threaded into the socket 35 and is provided with a centrally embedded bar 39 of conducting material. The forward end of the bar is recessed, as indicated at 40, to receive a spring 41 and a plunger contact 42 which resiliently engages the base contact 43 of the lamp 10.

A metallic sleeve 44 provided with a crimped flange 45 is slipped over the forward end of the plug 38 and has a bayonet socket 46 for engaging the base of the lamp 10. Behind the flange 45 is a shield 47 which is clamped against the flange, by a nut 49 threaded on the rear portion of the sleeve 44. The shell of the lamp is connected through the sleeve 44 to a conductor 48, held in place against the flange 43 by the nut 49. The base contact 43 of the lamp is connected to a conductor 51 by inserting the terminal 52 of the conductor into a drilled passage provided in the plug 38 and holding it in place by a small set screw 53.

An annular shield 54 is also preferably provided so that light will not be admitted through the openings 31 in the sleeve 30 and yet will permit a circulation of air longitudinally through the lamp housing.

A screw 55 secured by a nut 56 to the inner sleeve 30 projects upwardly through the lamp housing and is adapted to travel in a slot 57 when horizontal adjustment of the lamp 10 is being made. A knurled nut 58 threaded on the upper end of the screw 55 holds the two sleeves in adjusted position.

The forward end of the lamp housing 21 is provided with a sleeve 59 supported by a pair of annular members 60 and 61. A bracket 62 is secured by bolts 63 to the upper portion of the annular member 60 and supports a hood 64 above the opening 28 in the housing body 29. The sides of the hood are secured to the housing body by bolts 65 and are held in proper spaced relation to the housing by spacer sleeves 66.

The condensing lens 15 is mounted in a sleeve 67 and held in place by a retaining ring 68. The rear of the sleeve 67 carries the iris diaphragm 14 which may be similar to those used on cameras. It will be particularly noted that the sleeve 59 does not touch the ring 69 which supports the iris diaphragm so that the heat of the lamp housing is not conveyed by metal conduction to the specimen under observation.

The cell carrier 23 is carried by a platform 70 supported at opposite ends by machine screws 71 which are screwed into corner posts 72 of the galvanometer enclosure 22. Spacer sleeves 73 maintain the platform at a proper distance from the enclosure.

A lightproof cell housing 74 is supported on the platform 70 and comprises side plates 75 and 76, to the inner faces of which are secured other side plates 77. The bottoms of the plates 77 are positioned slightly above the upper face of the platform 70 to provide grooves for the flanged base 78 of the cell carrier 23, as shown particularly in Fig. 4.

Suitable openings 79 and 80 are provided in the plate 77 to permit light transmitted through the condensing lens 15 to pass through the cells 16 carried by the cell carrier. The top of the housing is closed by a roof 81 reinforced by bars 82 and 83 extending transversely of the apparatus.

The cell carrier is best shown in Fig. 5 and consists of a plurality of partitions 84 mounted on the base 78 and flanked by retaining strips 85 for holding the individual cells in place. It will be particularly noted that the cell carrier has a tight fit within the cell housing so that no light from an external source can leak into the apparatus and fall upon the light sensitive cell 18.

The forward flange 86 of the cell carrier is notched as indicated at 87 so that when the cells are centered with respect to the openings 79 and 80, a ball 88 urged rearwardly by a spring 89 and enclosed within a sleeve 90 will resiliently hold the cell carrier in position. The sleeve 90 extends between the rear wall of the enclosure 22 and the front wall of the platform 70.

In order to steady the front end of the lamp housing with respect to the rest of the apparatus, an arm 91 is rigidly suspended from the lower part of the annular member 61 and receives a stud bolt 92 which extends into the platform 70. A spacer sleeve 93 on the stud bolt holds the lamp housing an appropriate distance from the rest of the apparatus.

The enclosure 22 which houses the filter 17, light sensitive cell 18, and galvanometer 19 comprises four corner posts 72 to which side plates 94, and front and rear plates 95 and 96, respectively, are rigidly secured. The top of the housing is provided with a cover 97 having an opening 98 into which a magnifying lens 99 is placed to magnify the reading of the galvanometer 19. The scale of the galvanometer is illuminated by a bulb 100 which is connected to the same source of electricity as the lamp 10. It may, of course, be operated from any other source, if desired.

The rear wall 96 of the housing 22 has an opening 101 which is connected to the opening 80 of the cell housing by a sleeve 102. Clamped tightly against the rear wall 96 is the filter 17 supported by a holder 103 and having pieces of felt 104 interposed between the wall 96 and the holder to prevent light leakage. A ring 105 is soldered or otherwise secured to the front of the filter holder 103 to engage the light sensitive cell 18. Both filter and cell are clamped in place by nuts 106 which are threaded on bolts 107 engaging a retaining plate 108.

It is particularly desirable to have the position of the light sensitive cell 18 adjustable with reference to the rear wall 96 so that filters of different thicknesses and characteristics may be used for transmitting light waves in given bands.

Suitable switches 109, 110 are provided in the front wall 95 of the housing 22 for controlling the galvanometer and lamp circuits, respectively. The switch 109 merely short circuits the galvanometer from the photo-electric cell while the switch 110 opens and closes the source of current supply to the lamp 10 and indicator lamp 100.

In the operation of the apparatus, distilled water is placed in one of the cells 16 and the switches 109 and 110 closed. The cell is then moved into the beam of light, and after allowing the light to fall upon the light sensitive cell for a few moments, to permit it to reach its operating temperature, the iris diaphragm 14 is adjusted so that the galvanometer 19, which is graduated in hundredths, will read exactly 100. While this is being done, one of the other cells 16 may be filled with a specimen containing oxy-hemoglobin, and as soon as the galvanometer has become steady at 100, it can then be quickly moved into the beam of light. The percentage of light transmission can then be directly read on the galvanometer.

For convenience, the two outside cells mounted in the cell carrier are usually used for specimens, while the inner cell always contains distilled water, so that a check on the accuracy of the apparatus may always be obtained by passing the light through the pure water cell and observing if the galvanometer reading is still 100.

The shutter 13 is sometimes desirable to protect the light sensitive cell 18 by allowing the beam to fall upon the cell only when a reading is to be taken. However, the cell is not damaged by continual use unless excessive light is allowed to fall upon the cell.

When other substances besides oxy-hemoglobin are under observation, such as bilirubin, blood sugar, or any other substance, it is, of course, necessary to employ a filter which has the required light transmission characteristics.

As stated before, the invention is not limited to the illustrative embodiment which has been specifically described, or to the use for which that particular apparatus is intended. The appended claims, are, therefore, to be interpreted broadly except as they may be limited by the prior art.

The term "proportional" is used in the appended claims in its broadest sense, and is intended to include all forms of proportionalities including logarithmic proportions.

What we claim, therefore, is:

1. An apparatus for determining the relative concentration of oxy-hemoglobin in a solution, comprising a source of illumination, a condensing lens through which light from said source is projected, a cell for containing the solution of oxy-hemoglobin to be tested, movable to a position across the path of the rays from said light source, a light sensitive cell for receiving said rays, a filter having a maximal light transmission band for light waves having a length of approximately 530 millimicrons interposed between said lens and said cell, and means for measuring the electric current generated by said cell.

2. Apparatus for quantitatively determining the amount of a given substance in a translucent specimen by precise measurement of light transmission factors, said apparatus comprising a constant source of illumination, a light sensitive cell receiving energy from the source and converting it directly into electrical energy capable of measurement without the use of additional electromotive force, a light filter interposed between the source and the cell and having a light transmission band corresponding approximately to a characteristic absorption band of the given substance in the specimen whereby when the specimen is placed in the path of light between the source and the cell, the cell will produce a current proportional to the concentration of the substance in the specimen, and means for measuring the intensity of said current.

3. In apparatus of the class described, a constant source of illumination, a light sensitive cell receiving energy from the source in the form of light waves and converting it directly into electrical energy capable of measurement without the use of additional electromotive force, a translucent specimen containing a given substance interposed between the source of illumination and the cell, and a light filter also positioned between the source of illumination and the cell having a light transmission band corresponding approximately to a characteristic absorption band of the given substance, whereby the unabsorbed light falling upon the cell will bear a functional relationship to the concentration of the substance in the specimen.

4. The method of quantitatively determining the amount of a given substance in a translucent specimen by the precise measurement of light transmission factors, said method consisting in subjecting a specimen to light waves from a constant source of illumination, filtering out all light waves except those corresponding approximately to a characteristic absorption band of the given substance, and then allowing the unabsorbed light to fall upon a light sensitive cell capable of converting the light directly into electrical energy which can be measured by a galvanometer without the use of additional electromotive force.

5. In apparatus of the class described, a constant source of illumination, a condensing lens associated with the source, means for adjusting the source of illumination to the focal point of the lens, a cell carrier slidable transversely across the beam projected from the lens, a plurality of cells adapted to be inserted in the carrier so that any one may be exposed to the beam, means for filtering out all light waves except those corresponding approximately to a characteristic absorption band of the given substance, a light sensitive device on the side of the cell remote from the illumination source adapted to produce an electrical current proportional to the unabsorbed light passing through the cell, which can be measured by a galvanometer without use of additional electromotive force, and means for measuring the strength of said current.

6. A method of quantitatively determining the amount of a given substance in a translucent specimen by the precise measurement of light transmission factors which comprises determining the characteristic absorption band or bands of the substance, subjecting a specimen containing said substance to light waves from a constant source of illumination, filtering out all light waves except those corresponding approximately to one of said bands of said substance, and then causing the unabsorbed light to fall upon a light sensitive cell capable of converting the light directly into electrical energy which can be measured by a galvanometer without the use of additional electromotive force.

CHARLES SHEARD.
ARTHUR H. SANFORD.
DANA A. ROGERS.